United States Patent

Stevens

[11] Patent Number: 5,360,041
[45] Date of Patent: Nov. 1, 1994

[54] STUMP GRINDER

[76] Inventor: H. J. Stevens, 518 Gould Field Rd., Smackover, Ark. 71762

[21] Appl. No.: 166,834

[22] Filed: Dec. 15, 1993

[51] Int. Cl.$^5$ .......................... B27C 3/00; A01G 23/00
[52] U.S. Cl. .................................. 144/2 N; 144/218; 144/219; 241/278.1; 241/296
[58] Field of Search ............ 37/302; 291/101.7, 278.1, 291/296; 144/2 N, 162 R, 176, 218, 219

[56] References Cited

U.S. PATENT DOCUMENTS

| 290,923 | 12/1883 | Pope | 144/219 |
|---|---|---|---|
| 1,104,535 | 7/1914 | Moore | 144/2 N |
| 1,164,659 | 12/1915 | Moore | 144/2 N |
| 1,313,710 | 8/1919 | McKoy | 144/2 N |
| 4,214,617 | 7/1980 | McKenny | 144/2 N |
| 4,783,914 | 11/1988 | Bowling | 37/302 |
| 4,960,157 | 10/1990 | Sheets | 144/34 R |
| 4,998,573 | 3/1991 | York | 144/34 R |
| 4,998,574 | 3/1991 | Beach et al. | 144/241 |
| 5,054,703 | 10/1991 | Morey | 241/296 |
| 5,237,803 | 8/1993 | Dominque, Jr. | 56/16.8 |

FOREIGN PATENT DOCUMENTS

| 884627 | 11/1981 | U.S.S.R. | 144/2 N |
|---|---|---|---|
| 971169 | 11/1982 | U.S.S.R. | 144/2 N |

*Primary Examiner*—W. Donald Bray
*Attorney, Agent, or Firm*—Ray F. Cox

[57] ABSTRACT

A stump grinder adapted to be attached to and driven by a bushhog in which a vertical plate is attached to a horizontal circular plate having means for attachment to a bushhog. The vertical plate comprises a central wedge-shaped bit having a pair of cutting surfaces and a pair of sloped outer portions carrying a plurality of carbide cutting teeth. The carbide cutting teeth may be removably attached to the vertical plate.

6 Claims, 1 Drawing Sheet

STUMP GRINDER

BACKGROUND OF THE INVENTION

The apparatus of the present invention relates to stump grinders, and more particularly to devices which are adapted to be mounted to bushhogs and which may be used to grind tree stumps situated in the ground.

In the modern practice of removing trees, it is possible to cut a tree trunk at or near ground level. The stump remaining in the ground is difficult to remove or destroy. Various devices have been employed to remove or destroy such tree stumps. Commonly these devices employ some means of cutting or grinding away the tree stump. One commonly employed device is a circular auger. Such devices are time consuming and difficult to operate and cannot readily be employed in the removal of large diameter tree stumps.

Some types of prior art stump grinders employ rotating circular wheels having grinding teeth located thereon. Typically these devices are employed with either manual or mechanical means to sweep the grinding teeth over the surface of the stump, thereby removing successive portions of the stump until an acceptable amount of the stump has been removed. An example of this type of stump grinder is found in U.S. Pat. No. 4,783,914 issued to Bowling on Nov. 15, 1988 for "Stump Remover." Bowling discloses a portable apparatus having a small internal combustion engine to provide rotational motion to a cutting assembly with four radially extending carbide teeth. The teeth are angled relative to the driving assembly. In use the device is manually swept across the surface of the stump so as to gradually grind away portions of the stump.

It is desirable to have a stump grinder that is capable of grinding away even large stumps in a single operation as opposed to the repetitive grinding operations that are common in the prior art. In a related art large circular disks arrayed with cutting teeth have been employed to cut trees and bushes. Typical examples of this type of apparatus are found in U.S. Pat. No. 4,998,573 issued to York on Mar. 12, 1991 for "Tree Cutting Apparatus" and U.S. Pat. No. 4,960,157 issued to Sheets on Oct. 2, 1990 for "Bush and Tree Cutter." Both York and Sheets disclose an apparatus which comprises a large circular disk having cutting teeth attached to the periphery thereof and means for simultaneously rotating the disk horizontally near ground level and moving the disk linearly so as to sever a tree trunk or bush. This type of apparatus is not, however, adapted to the removal of tree stumps since the teeth of the cutters are typically mounted radially outward from the periphery of the circular cutting disk.

In a related art large circular disks are mounted with a plurality of cutting teeth on the underside thereof so as to grind up tree stumps that have been removed from the ground. An example of such a device is found in U.S. Pat. No. 5,054,703 issued to Morey on Oct. 8, 1991 for "Stump Chipper Knife Assembly." Morey discloses a stump disintegrator in which cutting knives are arrayed in pockets formed in a rotating chipper disk such that the knives protrude from the face of the disk.

A common type of bush and tree cutting apparatus is known as a "bushhog." A description of such an apparatus is found in U.S. Pat. No. 5,237,803 issued to Domingue, Jr. on Aug. 24, 1993 for "Centrifugal Combination Sprayer/Cutter Apparatus", which is incorporated herein by reference. Domingue, Jr. discloses a combination sprayer/cutter apparatus which is adapted to be attached to a bushhog. The prior art does not disclose, however, a stump grinder apparatus adapted for attachment to a bushhog.

SUMMARY OF THE INVENTION

The apparatus of the present invention solves the problem of grinding stumps of any size located in the ground by means of a simple and effective apparatus which is adapted for attachment to the commonly available bushhog. A heavy circular steel disk is adapted for attachment to a bushhog. Rigidly attached to the circular disk and depending therefrom is a vertical plate which serves two purposes. A wedge-shaped extension of the vertical plate in the center thereof provides a wedge-shaped, centrally located cutting bit. The central bit is angled and sharpened on two edges and thereby provides a means to both guide and safely hold the stump grinder in the center of the stump. The vertical plate is sloped away from the central bit toward the horizontal circular plate. Arrayed along the sloped portions of the vertical plate are a plurality of carbide cutting teeth. The arrangement of carbide cutting teeth makes for a rugged and effective apparatus which can grind both small and large stumps in a single operation. The weight of both the cutting apparatus itself and of the bushhog combine to assure firm and positive pressure of the apparatus against the surface of the stump so as to effectuate complete and rapid removal of the stump.

The carbide cutting teeth may be permanently affixed to the apparatus or may be removably affixed so as to replace broken teeth.

Since several varieties of bushhogs exist, the apparatus of the present invention may be adapted to fit all variations of bushhogs by including multiple arrangements of mounting holes.

The principal object of the present invention is to provide for a stump grinder which is capable of grinding away either large or small stumps in a single operation.

It is a further object of the present invention to provide for a stump grinder which may be attached to and driven by any of the commonly available varieties of bushhog.

It is an additional object of the present invention to provide for a stump grinder which is simply and ruggedly constructed.

It is a still further object of the present invention to provide for a stump grinder which may be safely and effectively deployed with a minimal amount of personal intervention by the operator.

Other objects and advantages of the present invention will be apparent to those skilled in the art from the following detailed description of the preferred embodiment in conjunction with the appended drawings.

BRIEF DESCRIPTION OF THE DRAWINGS

FIG. 1 is oriented for viewing in conjunction with FIG. 3 and FIG. 2 is oriented for viewing in conjunction with FIG. 4.

DETAILED DESCRIPTION OF THE PREFERRED EMBODIMENT

Figure 1:
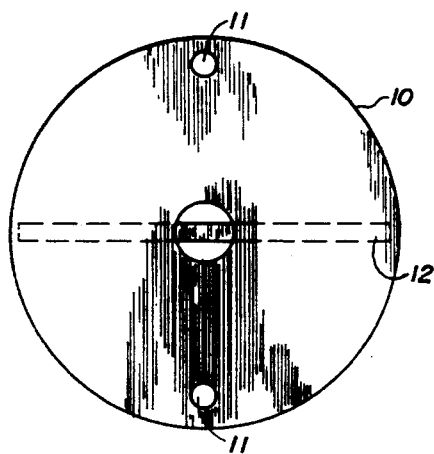
FIGS. 1 and 2 are plan views of the top side of the present invention.
Figure 2:
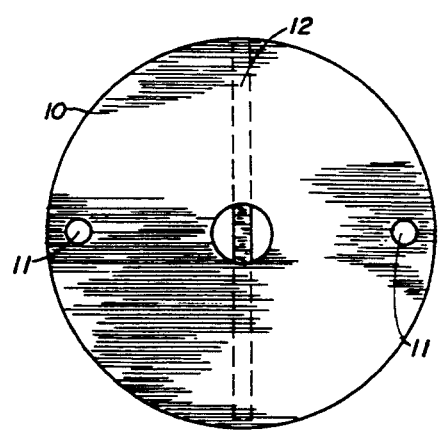

The present invention may be described with reference to FIGS. 1 and 2. A horizontal circular plate 10 is adapted to be attached to and driven by a bushhog. There are several varieties of bushhogs and, as a result, the arrangements for mounting the circular plate 10 to a particular type of bushhog may vary from the mounting arrangement used for a different type of bushhog. A typical arrangement of mounting holes 11 is shown in FIGS. 1 and 2. A different arrangement of mounting holes 11, such as a different number or location of mounting holes 11 might be required for a different variety of bushhog. The horizontal circular plate 10 can be provided either with mounting holes 11 adapted to a particular variety of bushhog or several sets of mounting holes 11 such that the apparatus of the present invention may be used with any of the common varieties of bushhog.

The apparatus of the present invention will typically be attached to a bushhog by the use of steel bolts through the mounting holes 11 and into the appropriate attachment points of the bushhog. One feature of the present invention that assists in the effective grinding of stumps is the weight associated with both the present invention and the bushhog to which it is attached. This weight is provided at least partly by the circular plate 10 which is constructed of heavy steel plate. A thickness of the horizontal circular plate 10 of one inch has been found to be an effective size. It may, therefore, be seen that the attachment of the present invention to a bushhog requires correspondingly rugged bolts. The use of one inch thick steel plate for the horizontal circular plate 10 also provides the degree of ruggedness required by the operation of the present invention.

Figure 3:
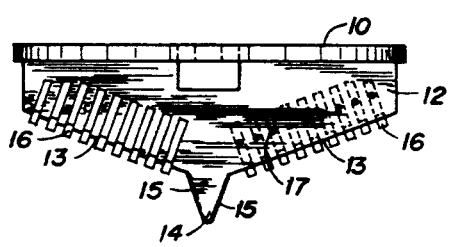
FIG. 3 is a front elevation of the present invention.
Figure 4:
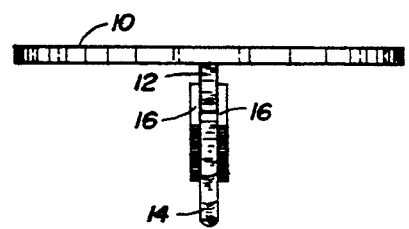
FIG. 4 is a side elevation of the present invention.

With reference to FIGS. 3 and 4, the present invention also comprises a vertical plate 12. The vertical plate 12 is likewise constructed of heavy steel plate. As with the horizontal circular plate 10, a thickness of one inch has been found to be an effective size for the vertical plate 12. The vertical plate 12 is rigidly affixed to the horizontal circular plate 10. In the preferred embodiment, the attachment of the horizontal circular plate 10 to the vertical plate 12 is accomplished by welding. However, any other means of rigid attachment between the horizontal circular plate 10 and the vertical plate 12 would be within the scope of the present invention.

The vertical plate 12 comprises a pair of sloped outer portions 13 and a central bit 14.

The central bit 14 is a wedge-shaped extension of the vertical plate 12. The central bit 14 has a pair of angled cutting surfaces 15. The central bit 14 functions to initiate and guide the grinding process. As the apparatus is lowered onto a stump, the central bit 14, impelled by the weight of the apparatus and by the weight of the bushhog, makes initial contact with the surface of the stump. The central bit 14 penetrates and engages the surface of the stump. The entire apparatus is rotated by the bushhog such that the angled cutting surfaces 15 bite into the surface of the stump and begin the grinding process. Since the central bit 14 is the first portion of the apparatus to penetrate into the stump, the central bit 14 acts to guide and stabilize the primary cutting operation which will be detailed below.

The sloped outer portions 13 of the vertical plate 12 slope from the central bit 14 outward from the central bit 14 toward the horizontal circular plate 10. The sloped portions 13 of the vertical plate 12 are provided with a plurality of cutting teeth 16. The cutting teeth 16 are carbide in the preferred embodiment. The cutting teeth 16 are spaced at regular radial intervals along the sloped outer portion 13 of the vertical plate 12. Since each of the cutting teeth 16 extends to approximately the same degree beyond the sloped outer portions 13 of the vertical plate 12, the cutting teeth 16 are also arrayed in a sloped configuration such that the cutting teeth 16 closest to the central bit 14 engage the surface of the stump first while the cutting teeth 16 farthest from the central bit 14 are the last to engage the surface of the stump.

In operation the rotating apparatus of the present invention is lowered onto the surface of the stump where the central bit 14 engages and guides the cutting action as described above. Following penetration of the central bit 14 into the surface of the stump, the carbide cutting teeth 16 successively engage the surface of the stump and penetrate downward into the stump until the stump has been ground below the surface.

The cutting teeth 16 may be attached to the vertical plate 12 by a number of means. In one alternative version of the preferred embodiment, the cutting teeth 16 may be attached to the vertical plate 12 by welding.

In an alternative version the cutting teeth 16 may contain one or more attachment holes. The vertical plate 12 would then be provided with a plurality of complementary attachment holes so that the cutting teeth 16 may be attached to the vertical plate 12 by a plurality of attachment bolts 17. The use of attachment bolts 17 to attach the cutting teeth 16 to the vertical plate 12 allows the cutting teeth 16 to be replaced if they become broken or dull from use.

The present invention has been described with respect to certain preferred embodiments which should be considered exemplary and not by way of limitation to the full scope of the present invention as set forth in the appended claims.

What is claimed:

1. A stump grinder adapted to be attached to and driven by a bushhog, comprising:
   (a) a horizontal circular plate having mounting holes for attachment to the bushhog;
   (b) a vertical plate rigidly affixed to and depending from said horizontal circular plate, said vertical plate having a central bit and a plurality of cutting teeth depending from said vertical plate and rigidly affixed thereto.

2. The stump grinder of claim 1 wherein said vertical plate further comprises a pair of outer portions each extending outward from said central bit and wherein said cutting teeth are spaced at regular radial intervals along said outer portions.

3. The stump grinder of claim 2 wherein said outer portions of said vertical plate slope from said central bit toward said horizontal circular plate.

4. The stump grinder of claim 3 wherein said central bit comprises a wedge-shaped extension of said vertical plate, said wedge-shaped extension having two angled cutting surfaces.

5. The stump grinder of claim 4 further comprising means for removably attaching said cutting teeth to said vertical plate.

6. The stump grinder of claim 5 wherein each of said cutting teeth includes at least one attachment hole and wherein said vertical plate includes a plurality of complementary attachment holes for removably bolting said cutting teeth to said vertical plate.

* * * * *